Figure 5:
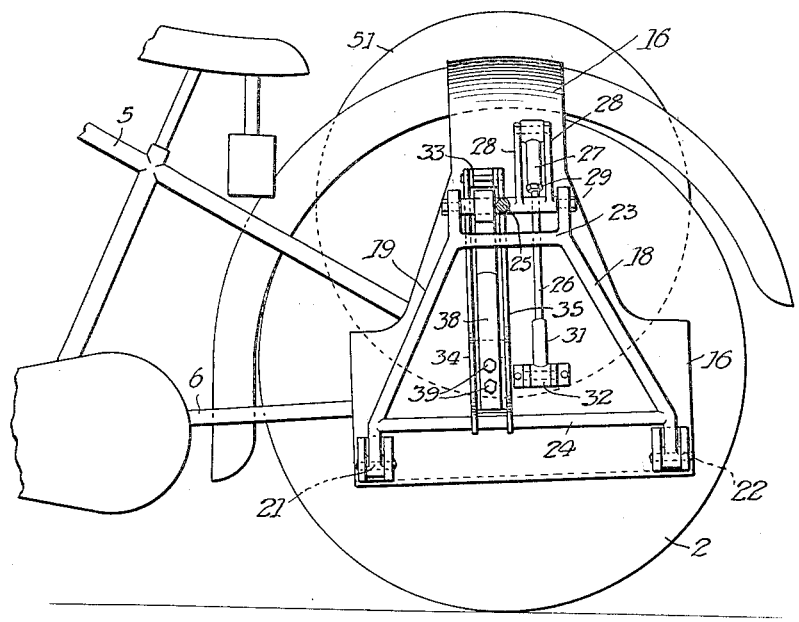

Aug. 8, 1933.                A. L. HESS                1,921,029
                         TOWABLE MOTOR CYCLE
                         Filed Sept. 1, 1932           3 Sheets-Sheet 1
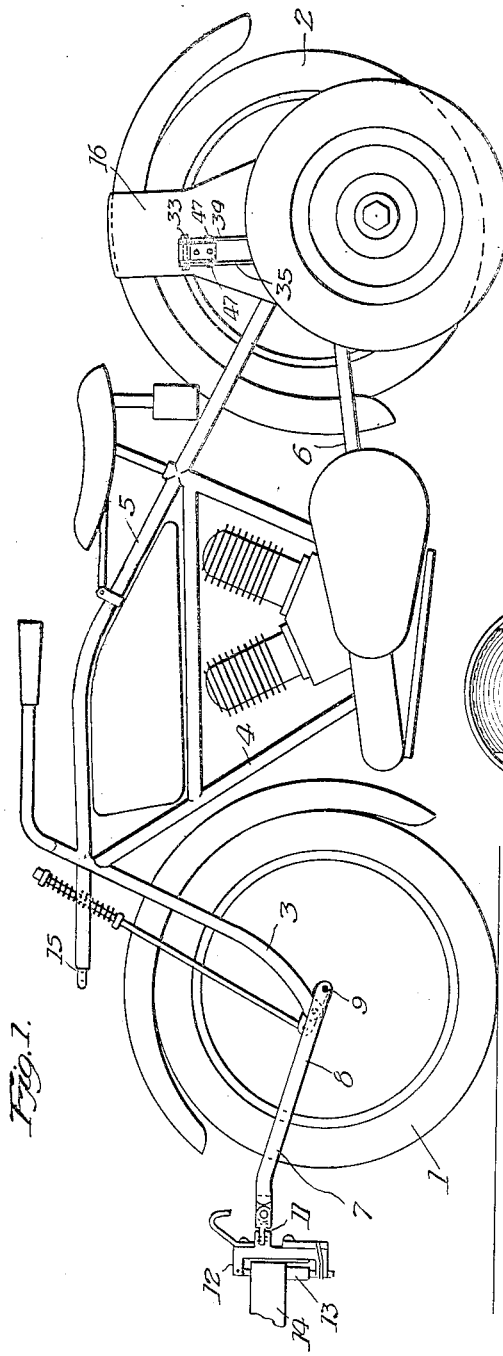
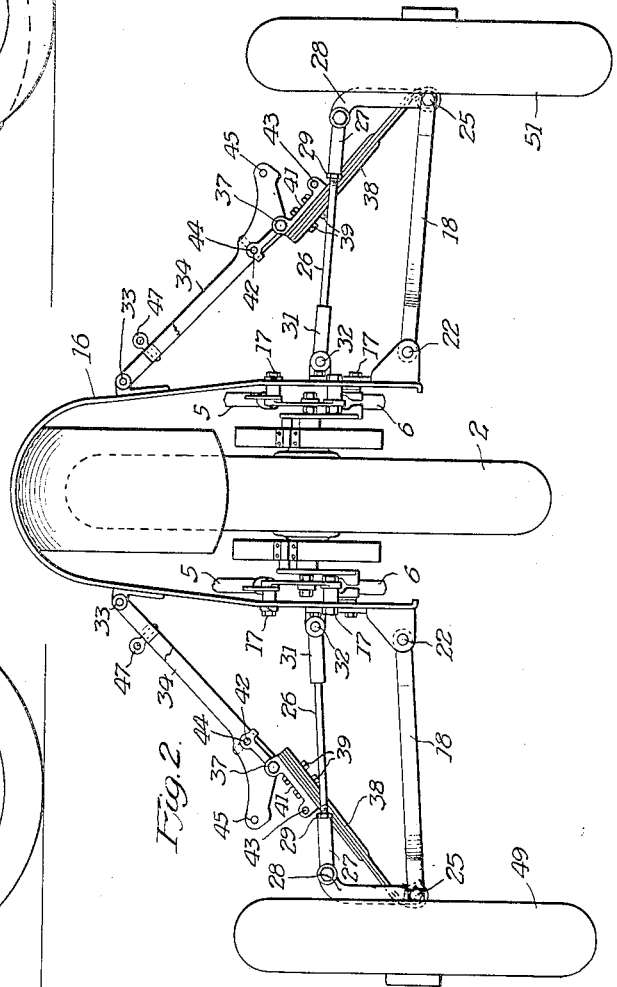
Witness:
R. B. Davison
Inventor:
Albert Lawrance Hess
By: Wilson, Dowell, McCanna & Rehm
Attys Aug. 8, 1933.  A. L. HESS  1,921,029
TOWABLE MOTOR CYCLE
Filed Sept. 1, 1932  3 Sheets-Sheet 2
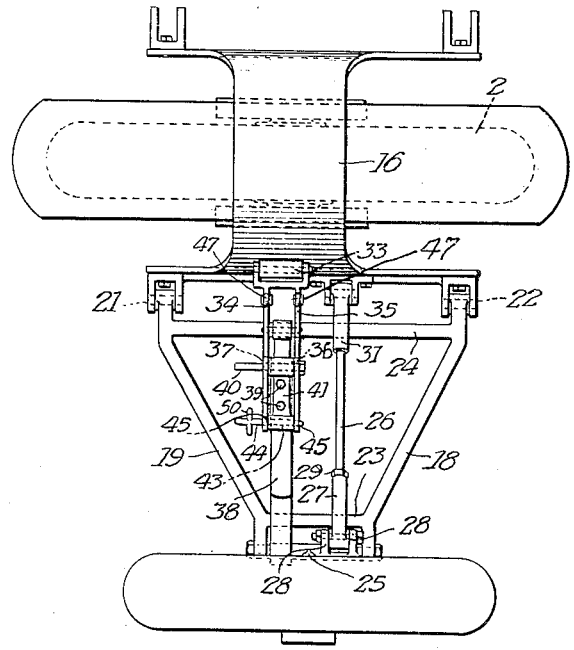
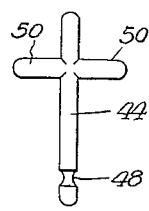
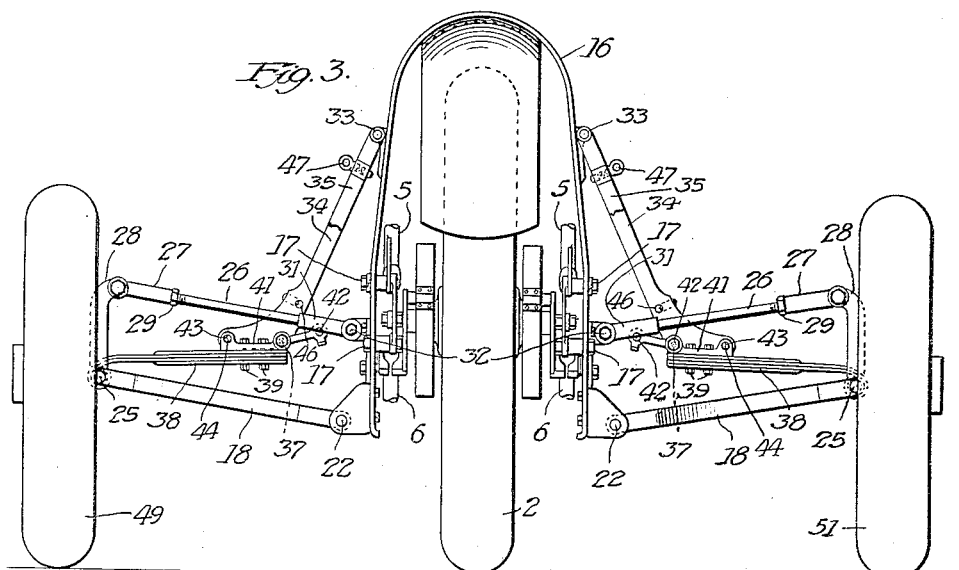
Witness:
R. B. Davison
Inventor:
Albert Lawrance Hess
By Wilson, Dowell, McCanna & Rehm
Attys.

Aug. 8, 1933.  A. L. HESS  1,921,029
TOWABLE MOTOR CYCLE
Filed Sept. 1, 1932   3 Sheets-Sheet 3

Witness.
R. B. Davison.

Inventor:
Albert Lawrance Hess
By: Wilson, Dowell, McCanna & Rehm
Attys.

Patented Aug. 8, 1933

1,921,029

UNITED STATES PATENT OFFICE 1,921,029

TOWABLE MOTOR CYCLE

Albert Laurance Hess, Los Angeles, Calif., assignor to Cycletow Corporation, Ltd., Los Angeles, Calif., a Corporation of California Application September 1, 1932. Serial No. 631,349

4 Claims. (Cl. 208—75)

This invention relates particularly to improvements over the motorcycles, disclosed in my prior United States Patents Nos. Re. 18,424, Re. 18,428 and 1,855,172, provided with auxiliary wheels which may be elevated into a carrying position when it is desired to propel the motorcycle itself on two wheels or which may be lowered to contact the ground simultaneously with the two wheels of the motorcycle or which may serve to elevate one wheel of the motorcycle to make it a three wheel vehicle which may be readily towed without danger of tipping over.

The structure of the motorcycle, including such parts as the motor and the customary frame members, are not part of this invention as the invention is such that it may be added to various two wheeled motorcycles.

The general object of the invention is to provide improved means for mounting and attaching auxiliary wheels on a motorcycle. Other specific objects and advantages of the invention will become apparent from a perusal of this specification.

Figure 6:
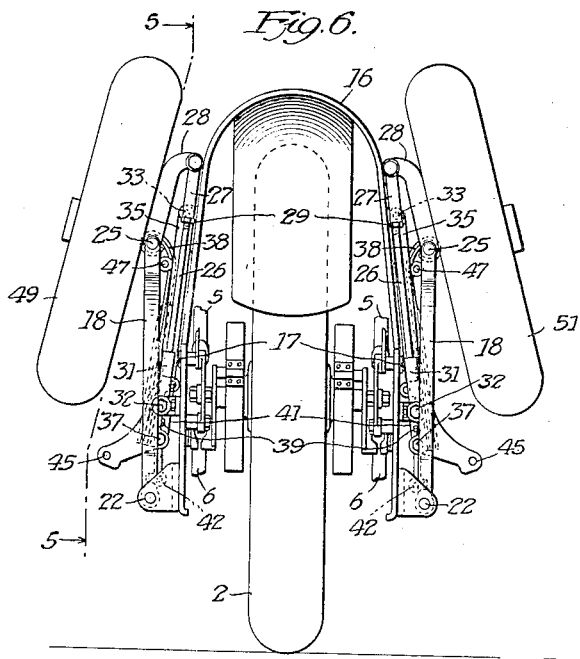

In the drawings:

Fig. 1 is a side elevation of a motorcycle with the auxiliary wheels of this invention attached and supporting the rear wheel of the motorcycle off the ground, Fig. 2 is an end elevation of the same motorcycle in the same position, Fig. 3 is a rear elevation of the same motorcycle with the auxiliary wheels contacting the ground simultaneously with the motorcycle rear wheel, Fig. 4 is a partial plan view of the structure shown in Fig. 3, Fig. 5 is in part a diagrammatic and in part a sectional view on line 5—5 of Fig. 6, Fig. 6 is a rear elevation showing both auxiliary wheels in carrying position, and Fig. 7 is an enlarged detail showing a locking pin hereinafter described.

In the drawings, a motorcycle of common construction is shown having a front wheel 1, a rear wheel 2, steering fork 3, main frame members 4, 5, 6, together with a bifurcated tow bar 7, the rear end of which bar has two branches, one of which numbered 8 is shown connected to the axle of the front wheel by a pin 9 passing through the front hub. On the front end of the tow bar a swivel joint generally indicated as 11 connects the bar with a clamping member 12 having a hinged member 13, the two of which members may be clamped about a rear bumper indicated by the numeral 14 of an automobile, back of which this device is intended to be towed when the auxiliary wheels are in the position shown in Figs. 1 and 2. When this cycle is not being towed the tow bar may be swung upwardly about its pivot 9 and held in that position by any suitable clamp or locking device 15.

The manner in which the auxiliary wheels may be secured to the motorcycle proper is subject to some variation, but at present it is preferred to mount a U-shaped bracket, generally indicated as 16, straddling the rear wheel of the motorcycle, with the lower opposite ends of the bracket secured in any appropriate way to the frame of the motorcycle. For example, the bracket may be rigidly bolted at the points 17 to the frame. Near the lower edge of the bracket on each side there is pivoted the wheel mounting bracket consisting of two legs 18 and 19, the inner ends of which are pivoted at 21 and 22 and supported thereon. Cross connecting bars 23 and 24 establish the spread of the wheel supporting members and rigidly connect them. At the outer end of each of these latter brackets there is mounted an auxiliary wheel axle generally indicated as 25. As indicated, the pivotal connections at opposite ends of the wheel supporting bracket are all horizontal and parallel.

Each leg of the U-shaped bracket also provides a pivot for the attachment of the alignment rods 26 which thread into internally threaded couplings 27, the latter being pivotally connected to upstanding arms 28 integral with the auxiliary wheel axles. A lock nut 29 is provided to lock the members 26 and 27 when they have been so adjusted that the auxiliary wheels will be maintained approximately vertically when in either of the positions shown in Figs. 2 or 3. The adjustable rod 26 therefore cooperates with the lower bracket 18—19 to hold the auxiliary wheel substantially vertical in its two operative positions, while in the carrying position the auxiliary wheels become slightly inclined inwardly at their tops as is indicated in Fig. 6. The inner end of the extension rod 26 is of course swivelly connected through a sleeve 31 to its pivot 32, but as this is a common form of construction it is not illustrated in detail herein.

For locking the auxiliary wheels in either of their two operative positions there are provided toggle levers each of which is constructed as follows. A pivotal connection 33 is provided on the upper portion of the wheel straddling support and from this pivot on each side of the U-shaped bracket a pair of arms 34 and 35 depend. Holes 36 are provided through which the permanent pivot pin 37 extends, this pin connecting the arms to the lower half of the toggle lever. This lower half consists of a plurality of leaf springs 38, the outer ends of some of which are curved to embrace the pivot pin 28. The inner ends of these springs are bolted together by means of the bolts 39 and secured to a casting 41. An extension 40 of the permanent pivot 37 serves as a handle which may be grasped for lifting the toggle lever. This casting is embraced between the legs 34 and 35 of the toggle lever and is provided with a hole through which the permanent pivot pin 37 extends. This casting is provided with two other holes 42 and 43 through either of which the removable locking pin 44 may be inserted. The lower ends of the toggle lever legs 34 and 35 are provided with holes 45 and 46. When the hole 43 in the casting registers with the holes 45 of the toggle lever and the removable locking pin 44 inserted therein, the auxiliary wheels will be held contacting the ground simultaneously with the motorcycle drive wheel, as is shown in Fig. 3.

By removing the locking pin 44 the toggle lever may be straightened out until the hole 42 in the casting registers with the holes 46 in the upper members of the toggle lever, whereupon the pin may be inserted to hold the motorcycle rear wheel off the ground, as is shown in Fig. 2. If the locking pin is removed and the auxiliary wheels swung upwardly into the position shown in Fig. 6, this locking pin may be then inserted through the holes 47 of the toggle lever with the pin passing just outside of the curved portion of the spring leaves. Thus the auxiliary wheels will be locked in carrying position. As shown in Fig. 3 the holes through which the locking pin 44 is inserted are provided with spring pressed balls which engage the annular groove 48 in the pin (see Fig. 7) to prevent it from jarring loose. As shown in Fig. 7 this removable pin is provided with finger grips 50 for facilitating its removal and insertion. The details of the mounting of such a common structure as a spring pressed ball for such purpose need not be shown as such a construction is already too well known to require description.

Referring to Figs. 1 and 2, it will be observed that when the motorcycle rear wheel is held off the ground the weight of the rear end of the motorcycle is supported on the auxiliary wheels through the leaf springs 38. Though these springs provide some yield in carrying the weight of the motorcycle, yet they are nevertheless sufficiently rigid for their supporting task. On the other hand, when the rear wheel of the motorcycle is lowered to the ground and the toggle lever locked as shown in Fig. 3, the motorcycle may then be ridden by the driver, propelled under its own power, with the auxiliary wheels furnishing additional balancing support. At such a time the leaf springs then permit either wheel to override road obstructions without causing the drive wheel to become elevated off the ground with consequent loss of traction. Furthermore, when the motorcycle is being so ridden the operator can lean the motorcycle when going around curves, leaning it against the pressure of the springs. This additional balance of the motorcycle is particularly helpful when the driver is operating on muddy and slippery roads or in the snow.

With the motorcycle in the towing position shown in Fig. 2, it can be towed behind an automobile, attached to the bumper thereof and the spread of the auxiliary wheels is sufficient to maintain the balance of the towed motorcycle at all speeds, around curves and over the road irregularities that may be encountered.

However, when the motorcycle is being ridden by the operator with the auxiliary wheels in carrying position, as shown in Fig. 6, the auxiliary wheels are held close to the side of the motorcycle and do not extend to an unnecessary extent outwardly at the sides thereof. Consequently the rider can drive the cycle in that condition through narrow lanes of traffic, for example, along the curb or through the middle of the street, making his way through lanes too narrow for an ordinary three wheeled motorcycle or an automobile and can get to his destination through city traffic much more rapidly than most vehicles. It is intended that a motorcycle equipped, in accordance with this invention, with auxiliary wheels is to be used largely for what is known as pick-up and delivery service, in the course of which service the driver can quickly ride to the customer's house with the auxiliary wheels retracted into carrying position. He then lowers the auxiliary wheels to the towing position shown in Fig. 2 and attaches the tow bar to the rear bumper of the customer's automobile and drives the automobile to the garage for storage or repairs. In wet and slippery weather, if he prefers, he may lower the auxiliary wheels to the balancing position shown in Fig. 3 and ride the cycle in that position without danger.

The auxiliary wheels are preferably provided with pneumatic tires 49 and 51 and preferably of a diameter large enough to readily override the usual road obstructions that may be encountered and, if necessary, low curbs.

It should be understood that the present invention involves improvements in towable cycles and that these improvements are susceptible of embodiment in more than one form, the preferred form only being here illustrated.

Having shown and described my invention, I claim:

1. In combination with a motorcycle, a pair of auxiliary wheels and axles therefor, a pair of rigid arms pivotally connected with each axle and with the motorcycle constructed and arranged to hold the auxiliary wheels substantially vertical when they are lowered into contact with the ground and to hold the wheels close together when said arms are swung upwardly about their pivotal connections to said motorcycle, and toggle levers connected to the motorcycle on opposite sides above said arms and also respectively to said auxiliary wheel axles, said levers being foldable along middle pivots and having leaf springs comprising their lower sections.

2. In combination with a motorcycle, a pair of auxiliary wheels and axles therefor and means for mounting each of said wheels on said motorcycle comprising respectively a pair of rigid members pivotally connected with each auxiliary wheel axle, one above the other, and pivotally connected with the motorcycle constructed and arranged for holding said wheels substantially vertical when contacting the ground and to hold the wheels close together when they are swung upwardly close to the motorcycle, and a toggle lever connected to each auxiliary wheel axle and to the motorcycle above said rigid arms, the lower half of said levers being formed of leaf springs constructed and arranged for yieldably supporting the rear end of the motor cycle when on said auxiliary wheel axles.

3. In combination with a motorcycle, a pair of auxiliary wheels and axles therefor, means for mounting said wheels on said motorcycle including rigid members pivotally connected one above the other to the motorcycle and to said axle, toggle levers connected to the motorcycle constructed and arranged to carry the weight of the rear end of the motorcycle upon said auxiliary wheel axles when the rear end of the motorcycle is elevated above the ground, the lower ends of said levers being formed of leaf springs connected to said axles.

4. In combination with a motorcycle, a pair of auxiliary wheels and axles therefor, and means for mounting said wheels on said motorcycle comprising substantially parallel superposed rigid members connecting each of said wheel axles to said motorcycle on opposite sides and toggle levers connected with each axle and to opposite sides of the motorcycle well above said rigid members for holding the rear wheel of the motorcycle elevated off the ground between said auxiliary wheels when said toggle levers are in their most extended position, the middle portion of each lever being provided with a joint, apertures, and a locking pin for holding the lever selectively in said extended position or in a partially folded position, the latter position being assumed when both auxiliary wheels and the motorcycle wheels are all on the ground, the lower end of each lever being a flexible element to assist in yieldingly balancing the motorcycle between said auxiliary wheels in the last described position.

ALBERT LAURANCE HESS.